(12) United States Patent
Gligan et al.

(10) Patent No.: US 12,154,358 B2
(45) Date of Patent: Nov. 26, 2024

(54) FORM EXTRACTOR

(71) Applicant: UiPath, Inc., New York, NY (US)

(72) Inventors: Ioana Gligan, Cluj (RO);
Tudor-Alexandru Carean, Cluj (RO);
Paul Parau, Cluj (RO); Tarun Singh,
Sammamish, WA (US); Tony Y. Tzeng,
Mercer Island, WA (US)

(73) Assignee: UIPATH, INC., New York, NY (US)

( * ) Notice: Subject to any disclaimer, the term of this patent is extended or adjusted under 35 U.S.C. 154(b) by 0 days.

(21) Appl. No.: 17/139,408

(22) Filed: Dec. 31, 2020

(65) Prior Publication Data
US 2022/0207268 A1    Jun. 30, 2022

(51) Int. Cl.
*G06V 30/412* (2022.01)
*G06F 16/906* (2019.01)
(Continued)

(52) U.S. Cl.
CPC .......... *G06V 30/412* (2022.01); *G06F 16/906* (2019.01); *G06F 16/93* (2019.01);
(Continued)

(58) Field of Classification Search
CPC ... G06K 9/00449; G06F 16/906; G06F 16/93; G06F 40/137; G06F 40/186; G06F 40/174
See application file for complete search history.

(56) References Cited

U.S. PATENT DOCUMENTS

| 6,778,703 B1* | 8/2004 | Zlotnick | G06V 30/412 |
| | | | 382/218 |
| 7,200,809 B1* | 4/2007 | Paul | H04L 67/04 |
| | | | 715/205 |

(Continued)

FOREIGN PATENT DOCUMENTS

| CA | 2275574 A1 * | 8/1998 | |
| CN | 110727962 A * | 1/2020 | G06F 21/64 |

(Continued)

OTHER PUBLICATIONS

International Search Report issued Feb. 18, 2022 in related PCT/US2021/057186.

(Continued)

*Primary Examiner* — Shahid K Khan
(74) *Attorney, Agent, or Firm* — VOLPE KOENIG (57) ABSTRACT

The present system and method relate generally to the field of Robotic Process Automation, particularly to a form data extractor for document processing. The system and method relate to a form extractor for document processing using RPA workflows that can be easily configured for different document types. The form extractor includes a set of templates for identifying the document type (classification) and extracting data from the documents. The templates can be configured, i.e., by the user, by defining the fields to be extracted and the position of the field on the document. The form extractor is resilient to changes in the position of the template on a page, as well as to scan rotation, size, quality, (Continued)

skew angle variations and file formats, thus allowing RPA processes to extract data from documents that need ingestion, independent of how they are created.

20 Claims, 9 Drawing Sheets (51) Int. Cl.
    *G06F 16/93*     (2019.01)
    *G06F 40/137*     (2020.01)
    *G06F 40/174*     (2020.01)
    *G06F 40/186*     (2020.01)

(52) U.S. Cl.
    CPC .......... *G06F 40/137* (2020.01); *G06F 40/174* (2020.01); *G06F 40/186* (2020.01)

(56) References Cited

U.S. PATENT DOCUMENTS

| | | | |
|---|---|---|---|
| 9,268,763 B1* | 2/2016 | Esho | G06F 40/143 |
| 10,489,682 B1* | 11/2019 | Kumar | G06V 30/19133 |
| 10,769,427 B1* | 9/2020 | Gajera | G06V 30/418 |
| 10,896,357 B1* | 1/2021 | Corcoran | G06V 30/1916 |
| 11,062,083 B1* | 7/2021 | Hitchcock | G06F 40/274 |
| 2002/0029194 A1* | 3/2002 | Lewis | G06Q 20/10 |
| | | | 705/40 |
| 2003/0036927 A1* | 2/2003 | Bowen | G16H 50/70 |
| | | | 707/999.104 |
| 2003/0110147 A1* | 6/2003 | Li | G06F 18/214 |
| | | | 706/1 |
| 2003/0210428 A1* | 11/2003 | Bevlin | G06Q 10/10 |
| | | | 358/1.18 |
| 2003/0229846 A1* | 12/2003 | Sethi | G06F 40/143 |
| | | | 715/239 |
| 2004/0162833 A1* | 8/2004 | Jones | G06F 40/137 |
| 2005/0067496 A1* | 3/2005 | Yen | G06K 7/10 |
| | | | 235/462.08 |
| 2005/0289182 A1* | 12/2005 | Pandian | G06Q 10/10 |
| 2007/0118538 A1* | 5/2007 | Ahern | G06F 40/174 |
| 2007/0154098 A1* | 7/2007 | Geva | G06F 40/174 |
| | | | 715/224 |
| 2008/0086432 A1* | 4/2008 | Schmidtler | G06F 16/353 |
| | | | 706/14 |
| 2008/0126396 A1* | 5/2008 | Gagnon | G06F 40/186 |
| | | | 707/999.102 |
| 2009/0152357 A1* | 6/2009 | Lei | G06Q 50/18 |
| | | | 235/454 |
| 2009/0307256 A1* | 12/2009 | Tiyyagura | G06F 16/81 |
| | | | 707/999.102 |
| 2010/0065624 A1* | 3/2010 | Taniguchi | G06Q 10/10 |
| | | | 235/376 |
| 2010/0083095 A1* | 4/2010 | Nikovski | G06F 16/951 |
| | | | 715/234 |
| 2010/0268720 A1* | 10/2010 | Spivack | G06F 16/81 |
| | | | 707/E17.014 |
| 2011/0055737 A1* | 3/2011 | Raman | G06F 9/451 |
| | | | 707/769 |
| 2013/0061124 A1* | 3/2013 | Patton | G06F 40/174 |
| | | | 715/224 |
| 2018/0196643 A1* | 7/2018 | Dolby | H04L 67/025 |
| 2018/0232204 A1* | 8/2018 | Ghatage | G06F 7/02 |
| 2018/0285332 A1* | 10/2018 | Aghaiipour | G06F 40/174 |
| 2020/0110792 A1* | 4/2020 | Tsabba | G06F 3/167 |
| 2020/0151663 A1 | 5/2020 | Balakrishnan et al. | |
| 2020/0234183 A1* | 7/2020 | Ghatage | G06N 20/00 |

FOREIGN PATENT DOCUMENTS

| | | | | |
|---|---|---|---|---|
| KR | 10-2020-0082801 A | | 7/2020 | |
| WO | WO-2009075987 A2 | * | 6/2009 | ........ G06F 17/30011 |

OTHER PUBLICATIONS

Shan et al., "Ensemble Optical Character Recognition Systems via Machine Learning," (Jan. 31, 2020).
Richard O. Duda, "CHAPTER 5—Linear Discriminant Functions" In: "Pattern Classification", Nov. 9, 2000 (Nov. 9, 2000), John Wiley & Sons, Incorporated, XP093166475; ISBN 978-1-118-58600-6; pp. 216-218; Retrieved from the Internet: URL:https://ebookcentral.proquest.com/lib/epo-ebooks/detail.action docID 699526.

* cited by examiner

Classify Document Scope

Input

Document Path: document
Taxonomy: taxonomy
Document Text: text
Document Object Model: dom Output
Classification Results: classificationResults

202 → Form Classifier
Endpoint: endpoint
Api Key: apiKey
Manage Templates

204 → Configure Classifiers

206 → Data Extraction Scope

Input

Document Path: document
Taxonomy: taxonomy
Document Text: text
Classification Result: classificationResults(0)
Document Object Model: dom
Document Type Id: Enter a VB expression Output
Extraction Results: results

208 → Form Extractor
Endpoint: endpoint
Api Key: apiKey
Manage Templates

210 → Configure Extractors

FORM EXTRACTOR

BACKGROUND

Technology associated with extracting data from documents requires a user to identify the fields in the document to extract the data manually. Extracting data from similar documents is a repetitive task and often leads to wasted time and skill, especially if performed manually. Tools have been created to configure data extraction from documents, using different algorithm techniques such as machine learning and rule-based configurations.

SUMMARY

The present system and method relate generally to the field of Robotic Process Automation, particularly to a form data extractor for document processing. The system and method relate to a form extractor for document processing using RPA workflows that can be easily configured for different document types. The form extractor includes a set of templates for identifying the document type (classification) and extracting data from the documents. The templates can be configured, i.e., by the user, by defining the fields to be extracted and the position of the field on the document. The form extractor is resilient to changes in the position of the template on a page, as well as to scan rotation, size, quality, skew angle variations and file formats, thus allowing RPA processes to extract data from documents that need ingestion, independent of how they are created.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

The present system and method relate generally to the field of Robotic Process Automation, particularly to a form data extractor for document processing. The system and method relate to a form extractor for document processing using RPA workflows that can be easily configured for different document types. The form-based extractor includes a set of templates for identifying the document type (classification) and extracting data from the documents. The templates can be configured, i.e., by the user, by defining the fields to be extracted and the position of the field on the document.

Figure 1A:
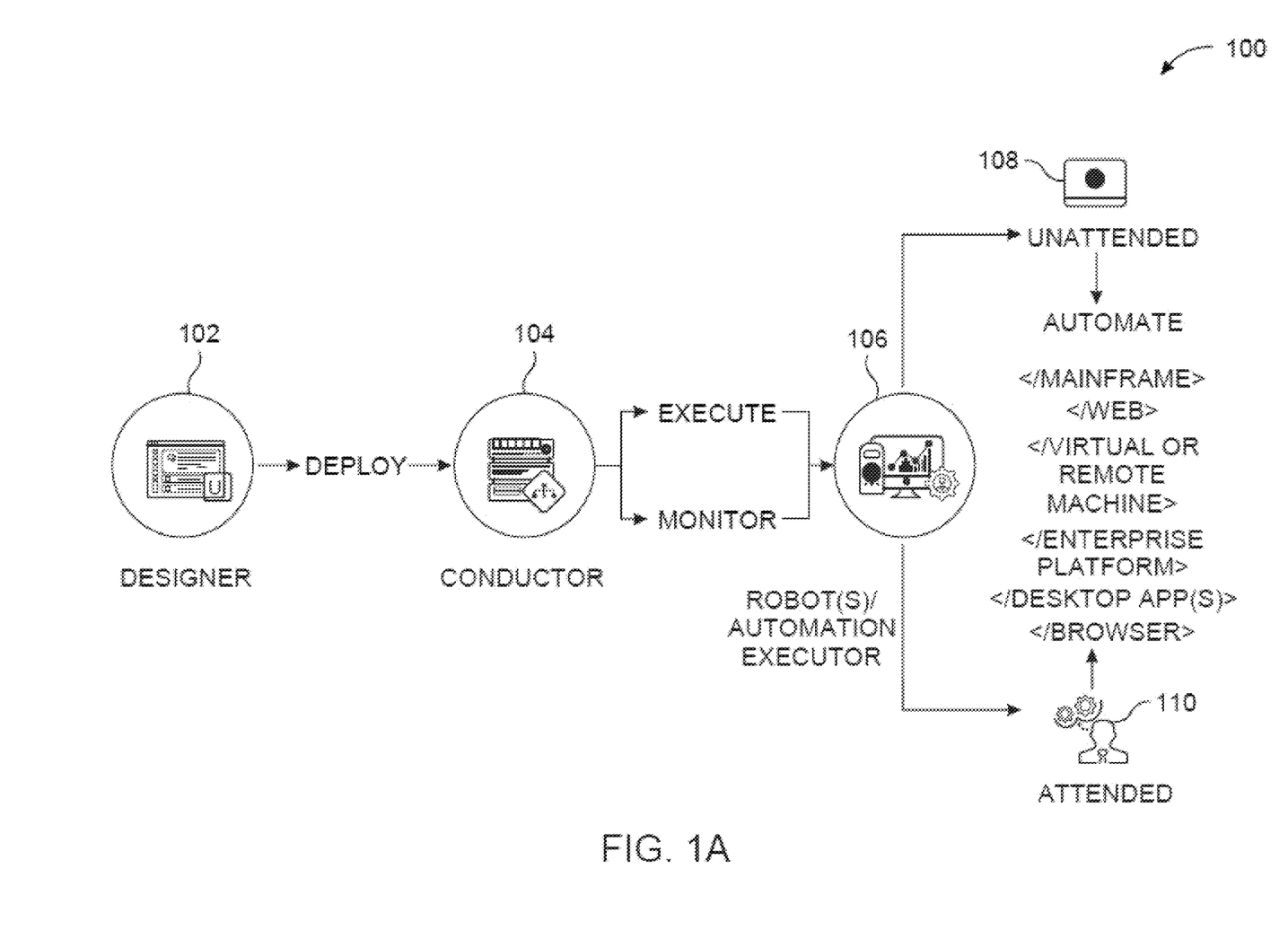
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third-party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
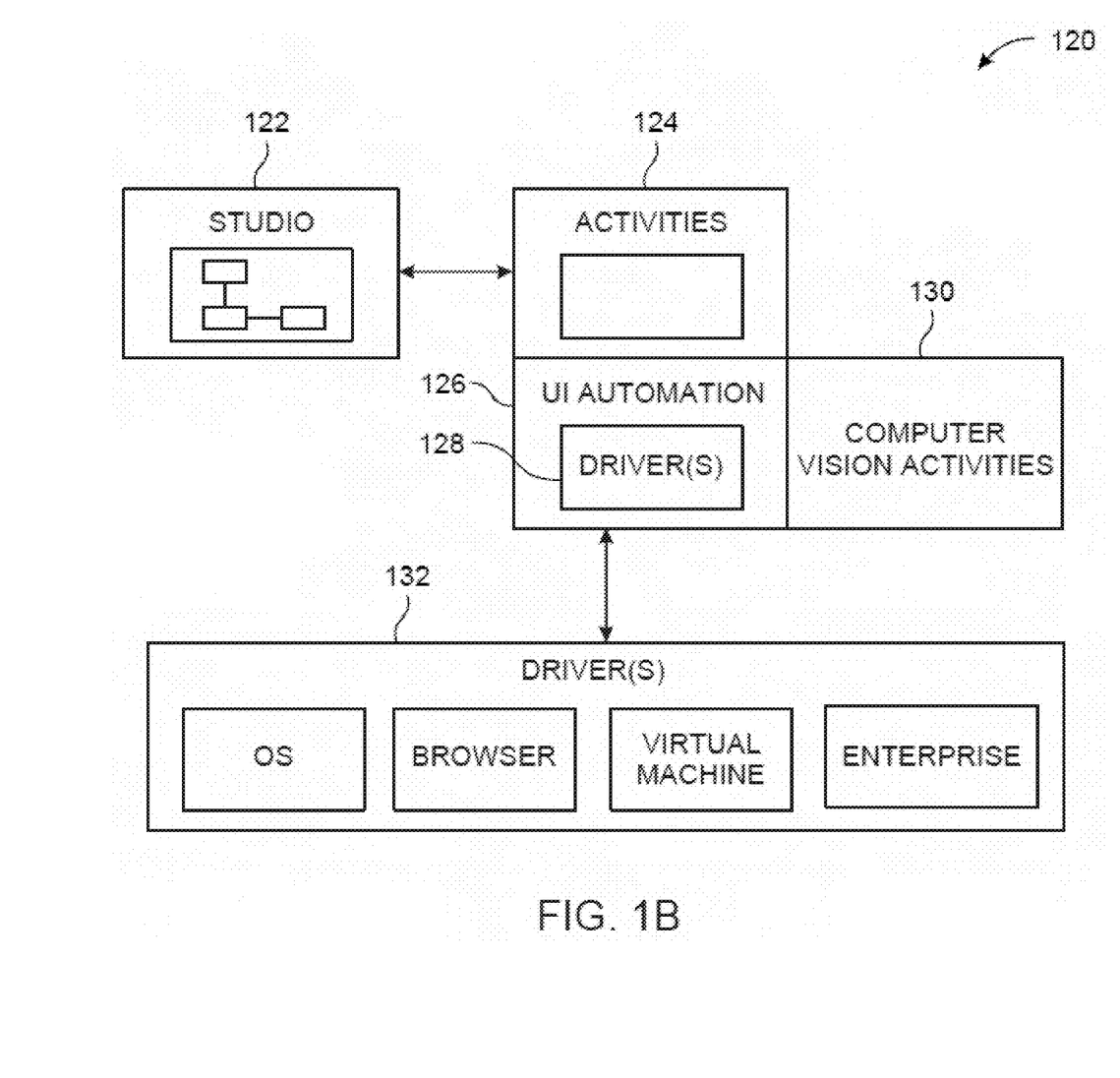
FIG. 1B is another illustration of RPA development, design, operation, or execution.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
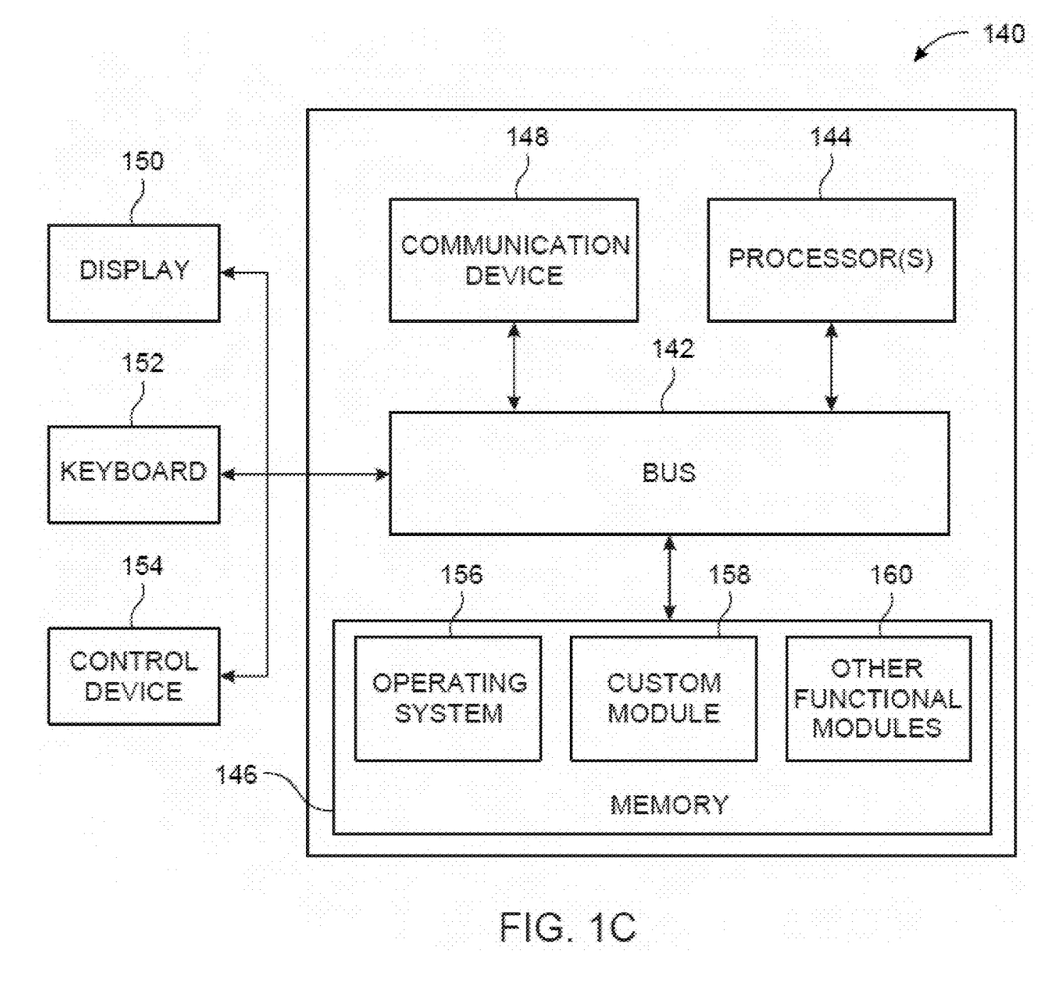
FIG. 1C is an illustration of a computing system or environment.

FIG. 10 is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

The present system and method provide a form extractor for document processing using RPA. The extractor uses a configured set of templates. These templates may be configured by the user, for example. When a document is input to the system, the system checks whether the document matches a pre-defined template. If the document matches with one of the pre-defined templates, the system classifies the document. After classification, the system starts extracting the information from the document based on position of fields in the document and displays the extracted information to the user.

In certain embodiments, the document provided may be classified by a classifier that has the same template as the extractor. The classifier uses a digitized version of the document. Classification may be performed by template matching, such as by looking for the keywords that were defined in the template, given the exact positions in the document. The classifier attempts to find a best possible combination of the keywords. If a defined keyword appears multiple times in the document, it uses anchors and the distance between the words to find the correct keyword as defined in the template. The classifier may compute a transformation matrix based on skew anchors, position, page size, etc., during the template matching process. The extractor may identify the exact positions in the document where extraction of the data needs to occur, using the previously computed transformation matrix and the field positions defined in the matching template. The extractor may use alternative methods for data extraction, such as field-level position based algorithms, to (1) refine the area in which a value is expected to occur and (2) attempt value extraction even if the template matching phase at document or page level fails. These positions are defined for all the templates relative to sample documents used for template creation purposes and loaded into the extractor. Such position definition may occur ahead of time, for example. Position definition may also occur during the training phase, in which the extractor may learn page-level template adjustments and variations, and field-level template adjustments, variations and potential other indicators for value areas. The extractor may use the page level reference and the document type from the template matching stage in order to apply the right template for extraction, and may use the field-level reference in order to adjust the target value areas and, in case templates fail to match, to identify new possible target areas.

Figure 2:
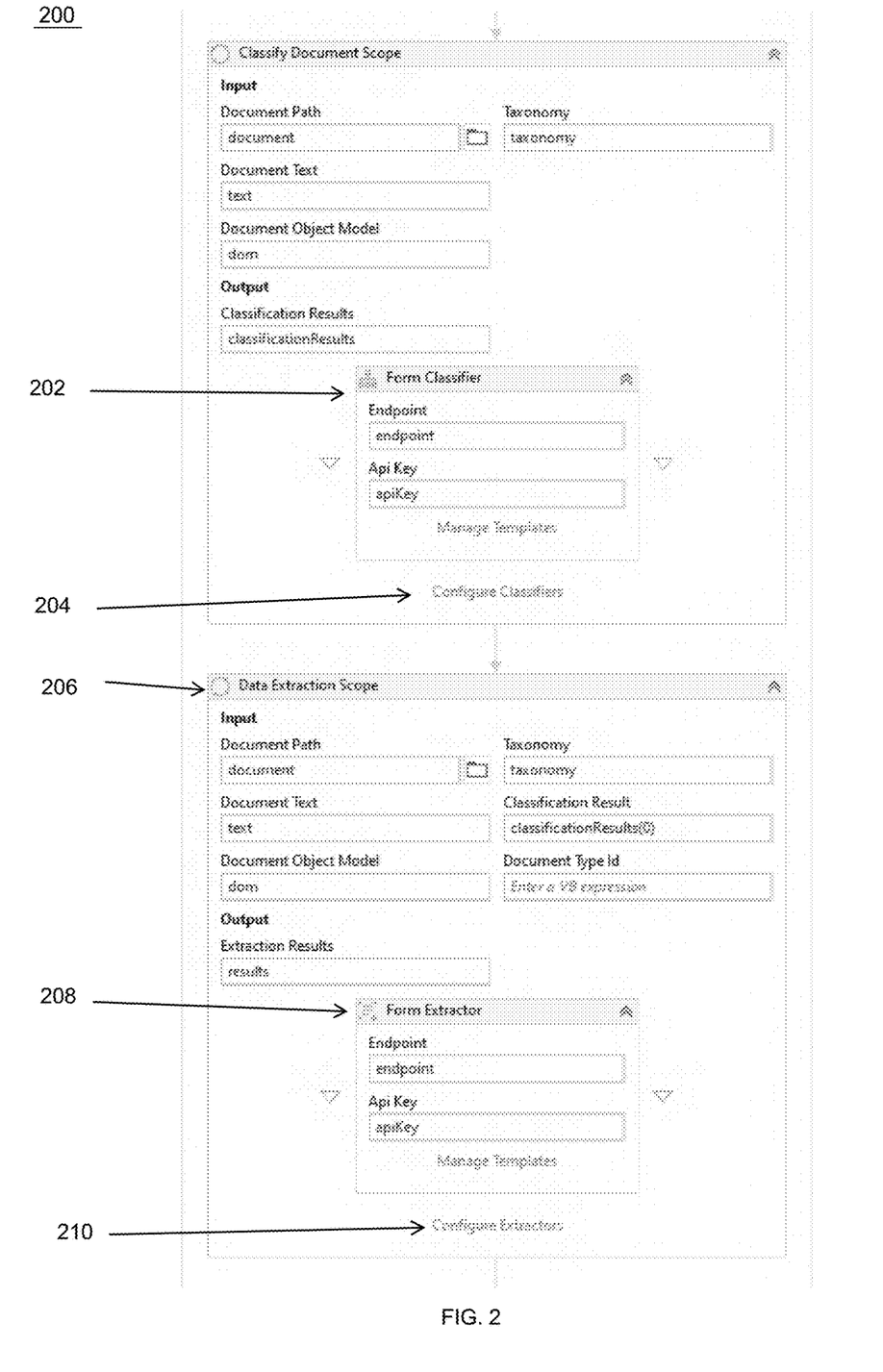
FIG. 2 is a screenshot illustrating a classify document scope workflow and a data extraction scope workflow.

FIG. 2 is a screenshot illustrating a classify document scope workflow and a data extraction scope workflow (collectively workflow 200), according to an embodiment of the present invention. Workflow 200 includes a form classifier ("Form Classifier") and extractor ("Form Extractor"). Workflow 200 includes a form classifier activity 202. A user can configure the classifiers in workflow 200 by clicking on a configure classifiers link 204. The classify document scope component can be configured with any desired number of classifiers in some embodiments.

Clicking configure classifiers link 204 opens classifier configuration interface, which provides a list of document types that may be processed and allows the user to select whether to apply one, both, or no classifiers to each document type. The user can also optionally enter internal taxonomy unique IDs for document types where each classifier is using an internal taxonomy In some embodiments, the classify document scope activity may allow setting of minimum confidence thresholds not only per classifier, but also at a classifier and document type level. In certain embodiments, the classify document scope activity, the classifier configuration, the prioritization algorithm, the user interfaces, the data structures, and the public contracts may experience changes and adjustments while retaining the same purpose of facilitating document classification in an open and extensible framework.

In some embodiments, a classification validation module offers a user interface for reviewing, correcting, and/or manually processing files for classification. Users may be able to review automatic classification by viewing ranges of pages from a processed file and the automatically associated document type, perform corrections at both the page range and document type level, delete or add new sections with associated document types, and/or fully manually process documents if desired.

The user interface of some embodiments offers a visual approach to understanding and making judgements about each individual page in a file. The user interface in some embodiments is available for usage independent of the classification components used in the previous automatic classification phase, providing a single, unified, state-of-the-art user interface for document classification review and processing. This approach may eliminate the need for humans to learn and use different screens for document classification dependent on the classification techniques that are employed, thus unifying the overall experience and decreasing the learning curve and overall time required for document processing.

In some embodiments the automatic data extraction functionality allows extractors in the workflow to be used interchangeably. Such embodiments may ensure standard inputs, standard outputs, brokerage between the extractors, and fallback mechanisms. Some examples of extractors may include, but are not limited to, template-based extractors, layout-based extractors, keyword-based extractors, regular expression-based extractors, context-based extractors, label/anchor-based extractors, pattern-based extractors, natural language processing-based extractors, machine learning extractors, metadata-based extractors, etc.

In some embodiments, the user can add any desired number of extractor implementations as plug-ins. In certain embodiments, the user may be able to delete, change, interchange, and change the order of the extractors. In some embodiments, the user can define acceptance criteria based on minimum confidence thresholds for each extractor that is used. In some embodiments, the user can define acceptance criteria based on minimum confidence thresholds for each field/extractor combination.

In some embodiments, the user can perform a taxonomy mapping from the master taxonomy (e.g., one designed and defined using the taxonomy manager in some embodiments) and one or more extractor internal taxonomies for the purpose of bringing all data to a common denominator in a unified manner. This functionality may be used when a given extractor reports an internal set of "capabilities" (i.e., fields the extractor can extract) as a result of data extraction that should be mapped (translated) to the master taxonomy. The user may decide the priority of the results from each extractor that is used. For example, an extractor may report values for a field called "INV-NO" when processing invoices, while the master taxonomy may contain a field called "Invoice Number." This functionality allows the specification that "INV-NO" reported from the extractor corresponds to an "Invoice Number" defined in the master taxonomy.

The user may also decide which extractor components are allowed to resolve certain fields and which are restricted from doing so. These functionalities allow fine tuning of document extraction given the known features and limitations of each extractor implementation (i.e., component) used in a specific use case. The extractors may be implemented as activities in an RPA workflow in some embodiments.

Workflow 200 includes a data extractor activity 206 and a form extractor activity 208. A user can configure the extractors in workflow 200 by clicking on a configure extractors link 210.

Clicking configure extractors link 210 opens an extractor configuration interface. Document types and fields from the master taxonomy can be viewed. Extractors are applied on a per-field basis by selecting corresponding checkboxes in each extractors pane and a fixed form extractor pane. The minimum confidence percentage can also be specified.

The document extraction functionality in this embodiment ensures the same type of output irrespective of the extractor used based on the digitized file and the taxonomy. In short, the document processing framework of some embodiments takes a file and a classification result with page bounds, attempts to identify data for each associated field, uses the extraction algorithms included in the workflow, collects the results, and reports the best result for each field based on confidence, ordering, and extractor chaining. In some embodiments, the extraction results may be further enhanced with business-specific information or validation, specific formatting, and/or other post-processing. In certain embodiments, the output of the automatic data extraction component may be checked/corrected/enhanced using any other RPA workflow activities available in any desired combination. These activities may be used to manipulate the output of the automatic data extraction and may add, remove, or change certain values contained in the result. This may be used for complex use cases in which extracted data should be enhanced with information from a database or other sources external to a singular file processed at that time, for example.

In some embodiments, a data extraction validation module provides a user interface for reviewing, correcting, and/or manually processing data points (i.e., extracted information) reported by the data extraction module. Users may be able to review results from the automatic data extraction by: (1) viewing values, evidence, positions where the extracted value is found within the document, extracted value confidence, etc. from a processed part of a document (e.g., on certain page ranges as pertaining to classification); (2) performing corrections by editing OCR errors in a correctly reported value, correcting positioning of a reported value, replacing a reported value entirely, adding a value missed by automatic processing, and/or by removing a value wrongly identified by automatic processing; (3) directly interacting with a graphical representation of the original file being processed by performing operations through selections of range, area, word(s), etc. directly on the original file view; (4) viewing and performing operations on the text version of the document; and/or also (5) fully manually processing documents when desired.

The user interface of some embodiments offers a visual approach to understanding and making judgements about individual fields and pieces of data to be identified and extracted in a file. The user interface in certain embodiments can be made available for usage independent of the data extraction components used in the previous automatic classification and data extraction phases, providing a single, unified, state-of-the-art user interface for document data extraction review and processing. This approach may eliminate the need for humans to learn and use different screens for data validation dependent on the data extraction techniques that are employed, thus unifying the overall experience and decreasing the learning curve and overall time for document processing. The data validation component of some embodiments allows definition and use of custom validation rules that can be checked before allowing a human to submit a document processed through the document validation functionality. In this manner, the module may ensure full extensibility and be made open to custom implementations depending on the business use case to be covered.

In some embodiments, a classifier training module facilitates the completion of the feedback loop for classifiers capable of learning from human feedback. The classifier training module may ensure, in a unified manner, that human-validated data and the information that enables algorithms to learn from human feedback reach the activated classifiers in a form that is understandable by the respective classifiers (e.g., by using the taxonomy mapping functionality) and with the correct permissions enabled (e.g., by using the train classifiers activation functionality). This approach may provide a unified experience for closing the feedback loop independent of the classifier(s) that are used, and may also be independent of the classifier components used for actual file classification. This allows RPA developers, for example, to train classifiers before they are activated for actual file classification, thus enabling "on-the-fly" training and eliminating the need of large volumes of up-front annotated files specific to each classification component.

The form-based classifier may also be used within the classifier training module. This enables ingestion of the human correction information with the purpose of adjusting/completing learning in the classifier with new data. The purpose of the classifier training (learning) module is to enable self-improvement of the classifier's performance as the classifier training module may learn more and more from the feedback provided by humans reviewing the results.

In some embodiments, an extractor training module facilitates the completion of the feedback loop for extractors capable of learning from human feedback. The extractor training module may ensure, in a unified manner, that human-validated data and information that enables algorithms to learn from human feedback reach the activated extractor(s) in a form understandable by the extractor(s) (e.g., by using the taxonomy mapping functionality) and with the correct permissions enabled (e.g., by using the train extractors field-level activation functionality). This approach may provide a unified experience for closing the feedback loop independent of which extractor component(s) are used, and may also be independent of the extractor components used for actual file processing for data extraction. This allows RPA developers, for example, to train extractors before they are activated for actual document data extraction, thus enabling "on-the-fly" training and eliminating the need of large volumes of up-front annotated files specific for each extraction component.

Similar to the classification training module, the form based extractor may also be used within the extractor training module to enable ingestion of the human correction information with the purpose of adjusting/completing extractor training module learning with new data. The purpose of the training (learning) module is that of enabling self-improvement of the extractor's performance as extractor training module may learn more and more from the feedback given by humans reviewing the results.

The classifier may operate on a digitized version of the document to identify the type of document. A "Taxonomy Manager" may be used to define the types of documents (e.g., bills, invoices, income tax forms, etc.) that are to be classified. The "Taxonomy Manager" allows specifying the document type and field names that are to be identified in the document. For example, a W-9 form may be processed. In "Taxonomy Manager" the document type may be defined as a W-9 form and fields added such as name, business name, address, SSN number, etc.

Figure 3:
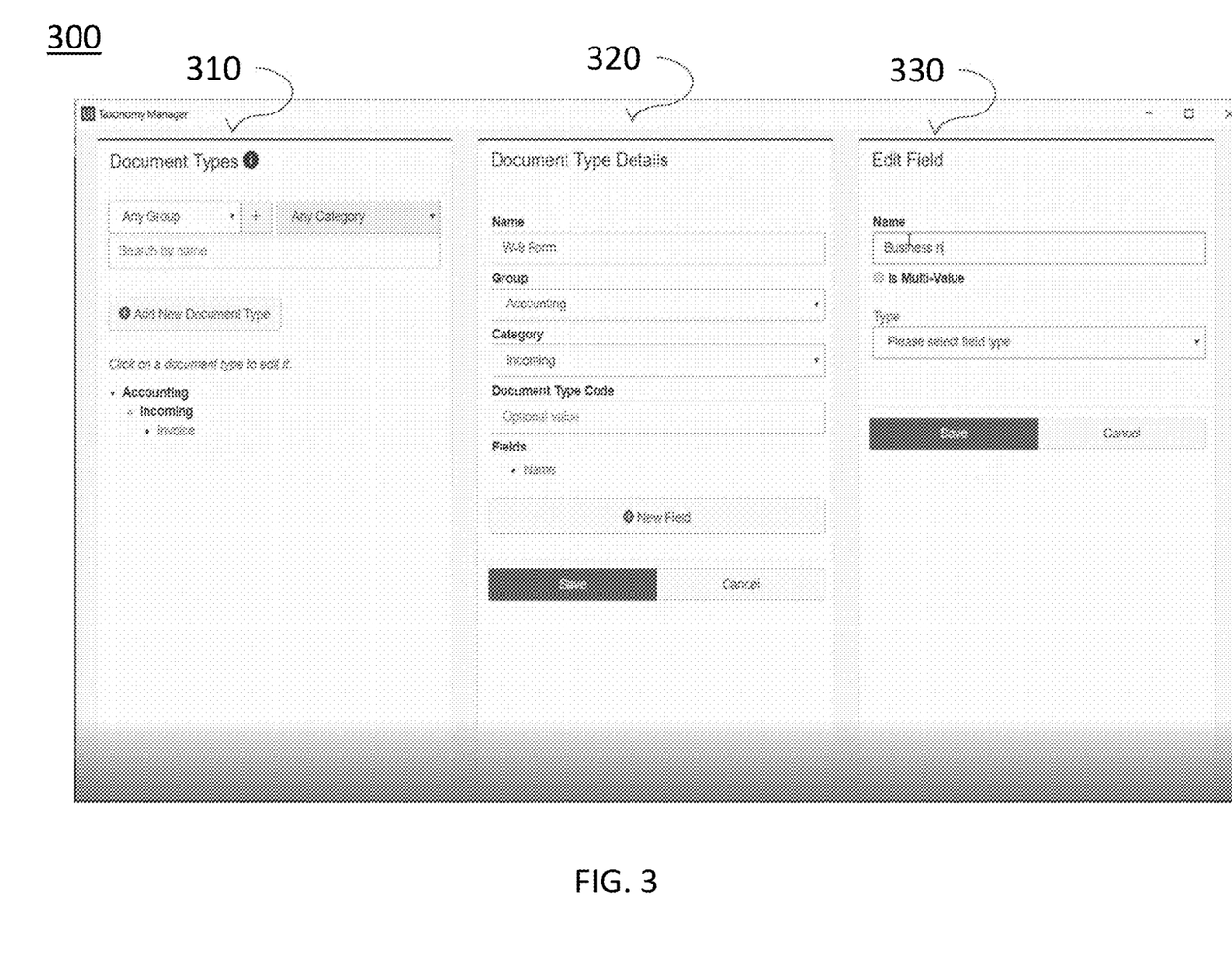
FIG. 3 is a screenshot illustrating a taxonomy manager, according to an embodiment.

FIG. 3 is a screenshot illustrating a taxonomy manager 300, according to an embodiment. Taxonomy manager 300 includes a document types definition interface 310, a document type details interface 320, and an edit field interface 330. Collectively, interfaces 310, 320, 330 allow a user to define a list of document types, provide document type details, and edit the fields of the document types.

Document types definition interface 310 is configured to allow the user to add new document types or edit or remove existing document types. The interface also provides functionality to select groups and categories, as well as to search for groups and categories. Groups and categories are used in this embodiment to better organize the collection of document types in the taxonomy. Group and category filtering may be available based on these settings in interface 310. Each document type can be assigned to a group and a category via interface 320. Taxonomy organization (e.g., by groups, categories, document types, fields, etc.) may change over time while retaining the same purpose of capturing document processing metadata. Furthermore, the data structures, user interfaces, and public contracts may also evolve in design, packaging, content, functionality, etc.

Document type details interface 320 allows the user to provide a name for a document type, as well as to select a group and category for the document type. A document type code may also be optionally specified. Fields associated with the document type are shown, and the user can add, edit, or remove fields as well.

Edit field interface 330 allows the user to edit the properties of a given field. Available properties may vary based on multiple factors that may include, but are not limited to, field type, category, group, etc.

After defining the types of documents and fields to be identified in taxonomy manager 300, the "Manage Templates" in form classifier 202 of the workflow 200 may be initiated to define the templates. This defining of template is completed by creating a template and uploading the document (such as insurance forms, bank forms, IRS filings). The defined templates may be used for both classification and data extraction.

Figure 4:
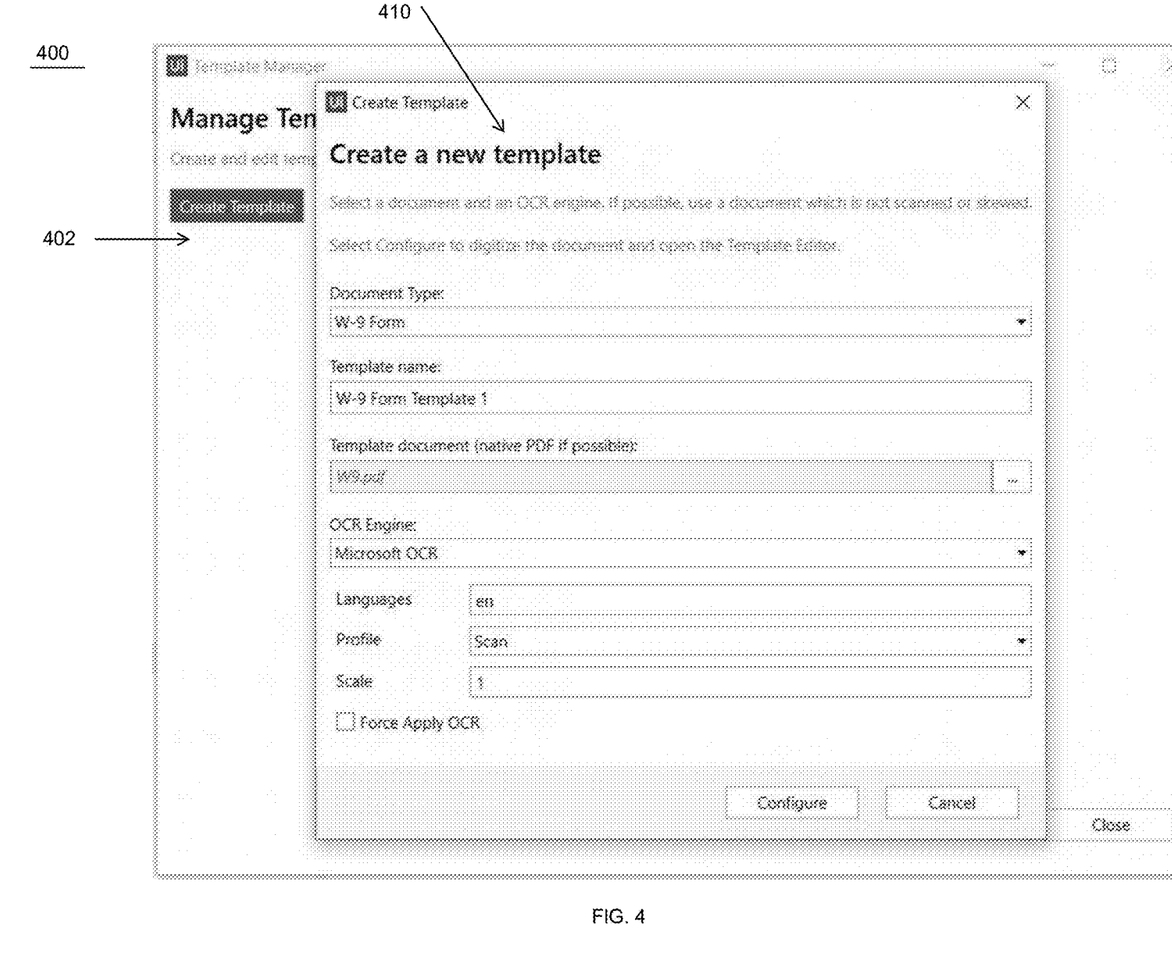
FIG. 4 is a screenshot illustrating a template manager for managing templates for document types according to an embodiment.

FIG. 4 is a screenshot illustrating a template manager 400 for managing templates for document types according to an embodiment. Template manager may be configured to provide for different document types and templates which may be selected within document types and template pane 402. Pane 402 may provide a user the ability to select any number of predefined templates for document types, including the exemplary shown templates for an invoice, such as "invoice 01," for example, and W9 form. Other document types may also be represented, although not shown in FIG. 4, including, but not limited to, bank statements, insurance forms, medical forms, IRS forms, utility bills etc. Any document type may be configured to use the form-based classifier and extractor with the purpose of performing document processing, if the method is suitable, with no limitation. As is illustrated in template manager 400, a document type may be identified although a template has yet to be created for that document type. In this situation, the document type may be annotated with a template "yet to be created" designation. Initiating such a template, the user may be presented within a window 410 for creating a new template. Window 410 includes entry points for the document type to be identified, the template to be named, a sample document, and an OCR engine to be used if the sample document is scanned. After entry of the designated information, the template may be created. The template manager may also allow editing previously created templates as well as exporting or importing previously created templates.

Figure 5:
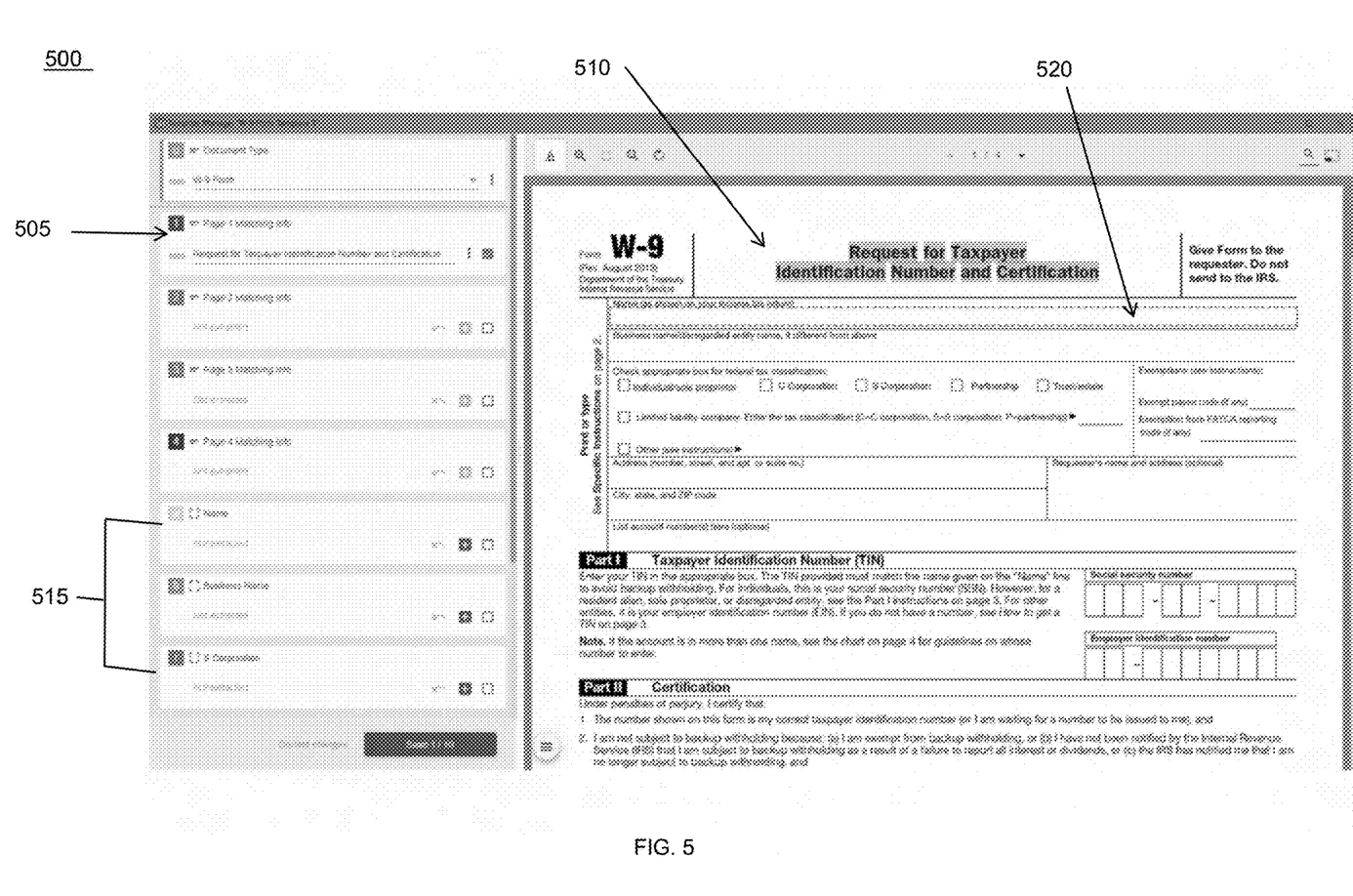
FIG. 5 is a screenshot illustrating a template manager for managing templates for a particular document type, according to an embodiment for a W-9 form template.

The user can define the fields or field areas (e.g., name, address, phone number, signature, etc.) that have to be extracted for the document by selecting the fields on a sample document (template) as shown in FIG. 5. FIG. 5 is a screenshot illustrating a template manager editing window 500 for managing a particular template for a particular document type, according to an embodiment for a W-9 form template. The user can define the parameters to classify the template and extract data by selecting the field's positions on the sample document and selecting relevant keywords (page matching information 505) for the current document type. This enables the Form Classifier to identify the matching template and the "Form Extractor" to identify the values for the particular field from the document at the identified positions. The page matching information may be defined for each page of the document and may represent keywords or static pieces of text, logos, stamps or other uniquely identifiable information that appear in the same position on all documents pertaining to the current document type. The taxonomy fields 515 may include fields such as name, business name, S corporation, C corporation, address, and social security number (SSN), by way of example. These fields may be identified within the document 510 with their respective positions templated for extraction.

In the exemplary screen shot of FIG. 5, the "name field configuration" in template manager editing window 500 may be initiated by highlighting the portion 520 from document 510 where the value for this field resides in the template document displayed alongside. After defining the positions (collectively) 520 for all the fields 515, the template is saved. The classifier and extractors are activated selecting configure classifiers 204 and configure extractors 210 in workflow 200.

For a given document type, multiple templates can be created, such as for a single document type, for exemplary purposes, a W-9 form, multiple templates, for exemplary purposes, variations of the W-9 form published in different IRS revisions, may be defined. The Form Extractor may find the best suitable template to use for data extraction.

Templates for the Form Extractor may be shared across different RPA initiatives, using Import and Export capabilities of a Template Manager. The Export capability may export data relevant for a series of templates selected for exporting, and may store alongside the templates any additional relevant information, such as: document type setting for which the template is created, run-time settings for how to treat specific field types, etc. The Import capability may ensure importing the template, the document type, the field level settings etc., and may also ensure adjustments of the given RPA process based on the newly imported information.

Figure 6:
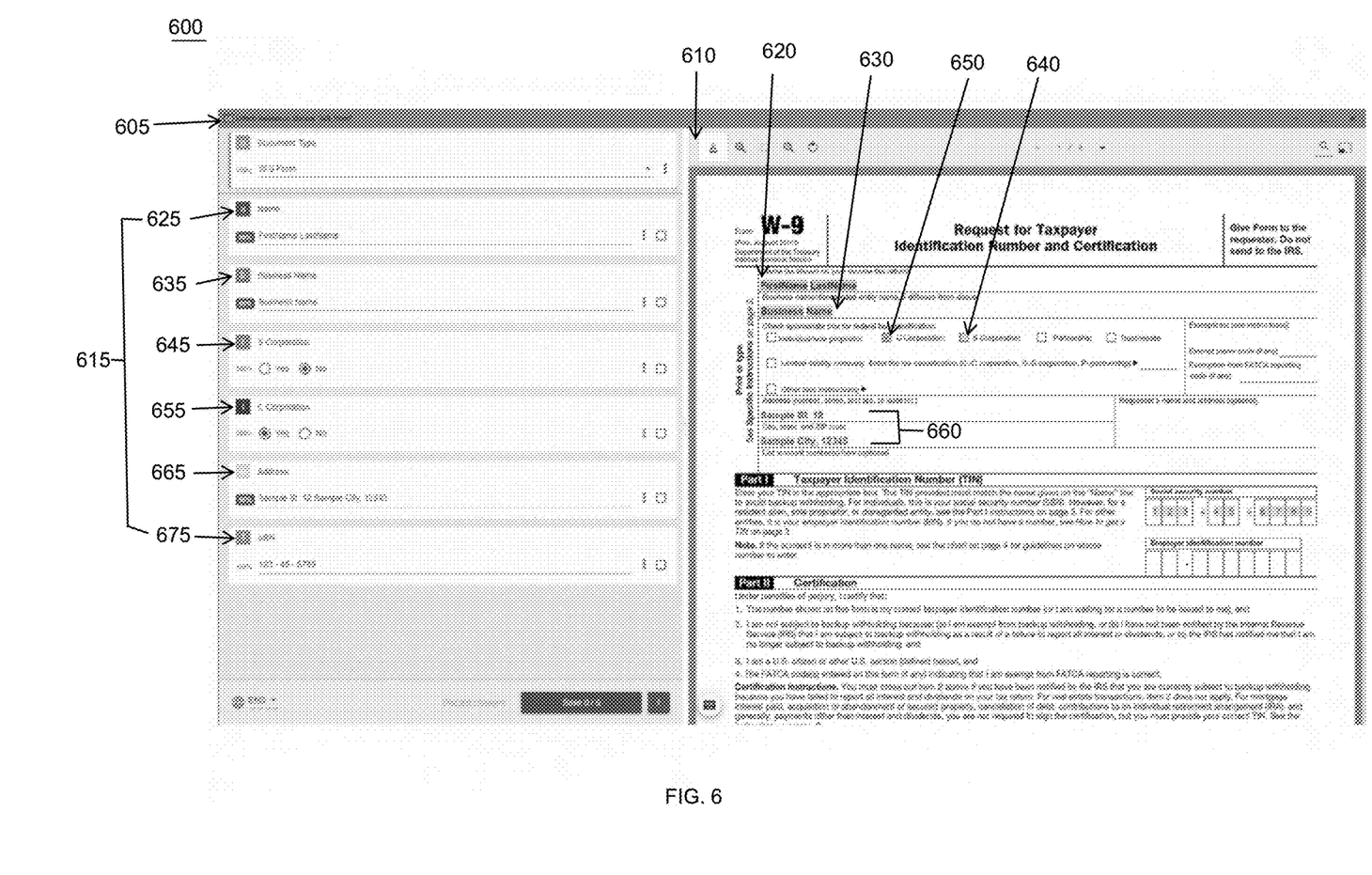
FIG. 6 is a screenshot of the validation window.

After the document is classified and data is extracted from document, data is displayed to the user on a "validation station window" alongside with the original document. If the data extracted by system is incorrect, the user is provided with a facility to modify the extracted data. FIG. 6 is a screenshot of the validation window 600. Window 600 includes a left portion 605 that identifies each of the pieces of data that was extracted from the document, while the right side 610 displays the document itself. This allows each field 615 to be monitored against the document portion where the data was extracted. For example, name 625 may be compared directly to the portion of the document containing the name 620. Continuing the example, business name 635 may be compared directly to the portion of the document containing the business name 630. Continuing the example, S corporation 645 may be compared directly to the portion of the document containing the check box for S corporation 640 and C corporation 655 may be compared directly to the portion of the document containing the check box for C corporation 650. Continuing the example, address 665 may be compared directly to the portion of the document containing address information 660. SSN 675 may also be compared directly to the portion of the document containing SSN information (not shown in FIG. 6). Additional fields 615 may include position locations within document 610 as would be understood from the specific exemplary fields described herein.

Figure 7:
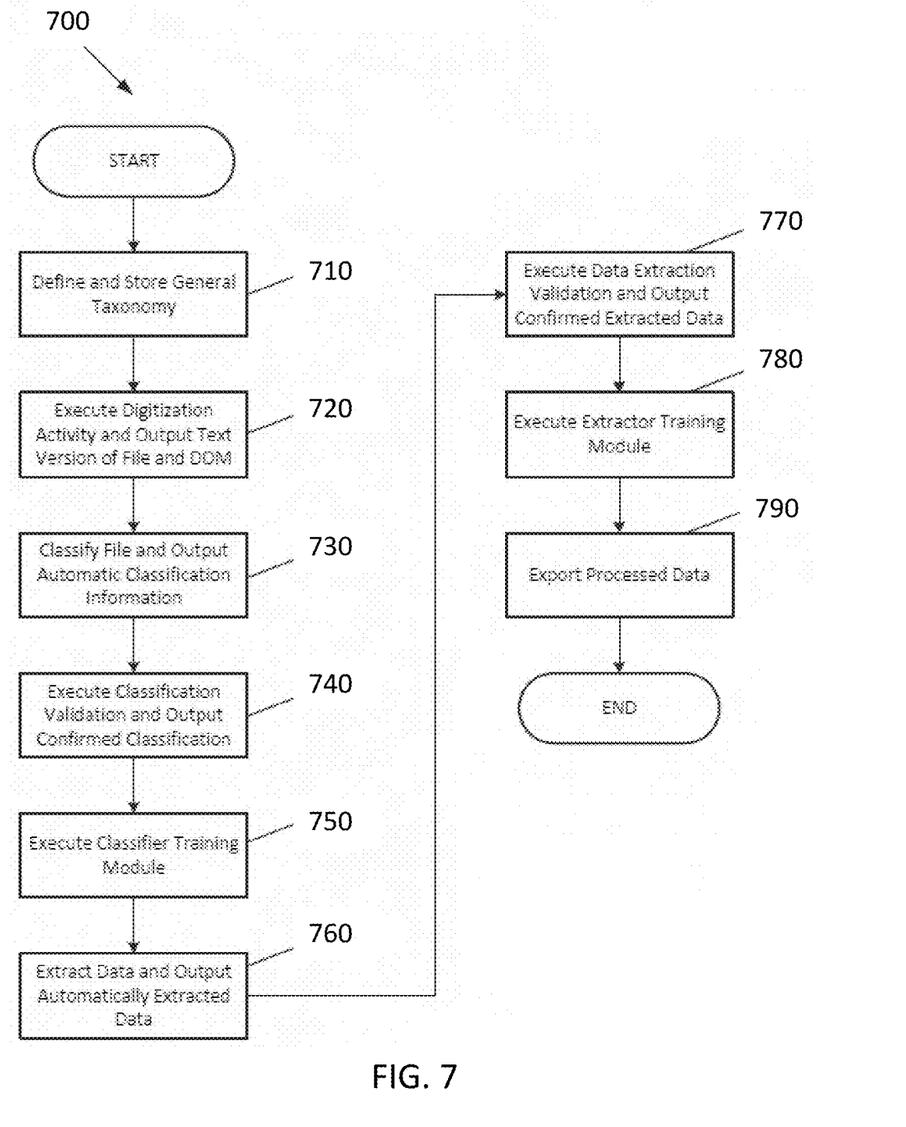
FIG. 7 is a flowchart illustrating a method for implementing a document processing framework for RPA, according to an embodiment of the present invention.

FIG. 7 is a flowchart illustrating a method 700 for implementing a document processing framework for RPA, according to an embodiment of the present invention. The process begins with defining and storing a general taxonomy at 710. In some embodiments, this may include executing a taxonomy manager providing an interface facilitating the definition of a list of document types targeted for classification and data extraction, along with associated fields for each of the document types, receiving the list of defined document types and the associated fields for each of the defined document types, and storing the list of document types and the associated fields in a master taxonomy data structure.

Next, a digitization activity is executed in an RPA workflow and a text version of a file and a Document Object Model (DOM) stored in a DOM data structure are output at 720. In some embodiments, the DOM includes information pertaining to typed sections, typed word groups, and word level information in the file that are enhanced with rotation, skew, and relative width and height information, and may also include an OCR confidence value. In certain embodiments, the digitization activity uses a plurality of OCR engines and the digitization activity includes implementing a voting system for the plurality of OCR engines and outputting a best combined result from the plurality of OCR engines.

The file is classified into one or more document types using one or more classifiers in the RPA workflow and automatic classification information is output at 730. This information may be stored in a classification data structure in some embodiments. In some embodiments, the one or more classifiers are configured to perform layout-based classification, sentiment-based classification, feature-based classification, natural language processing (NLP)-based classification, machine learning (ML)-based classification, deep learning-based classification, image-based classification, keyword-based classification, color-based classification, any combination thereof, or any other document classification method. In certain embodiments, the classification includes using acceptance criteria based on minimum confidence thresholds for each of the one or more classifiers. In some embodiments, the classification includes mapping the master taxonomy and an internal taxonomy of a respective classifier for the one or more classifiers. In certain embodiments, the classification includes prioritizing results from each classifier based on a classifier order in the RPA workflow, selecting classifiers of the one or more classifiers for use in the classification based on the document type, assigning a minimum confidence field to at least one of the one or more classifiers, or any combination thereof.

A classification validation module providing an interface for reviewing, correcting, and/or manually processing files for classification is executed and automatic classification information is output at 740. A classifier training module that facilitates completion of a feedback loop for the one or more classifiers is executed at 750. Then, data is extracted from the classified document using one or more extractors in the RPA workflow and the automatically extracted data is output at 760. This extracted data may be stored in an extraction data structure in some embodiments. In some embodiments, the extraction includes prioritizing results from each extractor based on an extractor order in the RPA workflow, selecting extractors of the one or more extractors for use in the extraction based on the document type, assigning a minimum confidence field to at least one of the one or more extractors, or any combination thereof.

A data extraction validation module providing an interface for correcting, and/or manually processing data points from the data extraction is executed and confirmed extracted data is output at 770. An extractor training module that facilitates completion of a feedback loop for the one or more extractors is executed at 780. The processed data, which includes classification results and extracted information, is then exported at 790. It should be noted that once the taxonomy is defined, one or more of steps 720-790 may be optional in some embodiments based on the needs of the use case.

After method 700 is completed, validated information is now available for usage in other systems. For instance, the information may be inserted into a database or an Excel® file, a notification with specific values may be sent via email, etc. By way of nonlimiting example, method 700 of FIG. 7 may begin with a PDF file and end with knowledge that the file is an Invoice, the Total Amount written in that Invoice is $42, the Vendor is "XYZ Bookstore," and the purchase date was Jul. 23, 2019. These values are now available to be programmatically inserted into an accounting system for example.

In the examples given herein, modules may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method to perform data extraction for document processing, the method comprising
    configuring one of a plurality of templates by defining a plurality of fields to be extracted and a position of each of the defined plurality of fields, at least one of the defined plurality of fields having associated therewith properties including the type of data collected;
    identifying a document type using the plurality of templates by using an acceptance criteria based on minimum confidence thresholds for ones of the plurality of templates using at least one classifier configured to employ layout-based classification; and
    processing the document with one of the configured plurality of templates associated with the identified document type by extracting data from the document using the defined plurality of fields identified from the identified document type from the layout-based classification, the field processing including a minimum confidence threshold based on the minimum confidence threshold for the ones of the plurality of templates.

2. The method of claim 1 further comprising improving the accuracy of the performed data extraction by enhancing the one of the plurality of templates with feedback from a validation of extracted data.

3. The method of claim 1 wherein the templates include field level settings.

4. The method of claim 3 wherein the field level settings include anchors.

5. The method of claim 1 further comprising defining a general taxonomy.

6. The method of claim 5 wherein the defining includes:
    providing an interface facilitating the defining of a list of document types targeted for classification and data extraction with associated fields for each of the document types; and
    receiving the list of defined document types and the associated fields for each of the defined document types.

7. The method of claim 5 further comprising storing the defined general taxonomy.

8. The method of claim 7 wherein the storing includes storing a list of document types and associated fields in a master taxonomy data structure.

9. The method of claim 1 further comprising executing a digitization activity in an RPA workflow.

10. The method of claim 9 wherein the digitization activity uses a plurality of OCR engines and the digitization activity includes implementing a voting system for the plurality of OCR engines and outputting a best combined result from the plurality of OCR engines.

11. The method of claim 9 further comprising outputting a text version of a file and a Document Object Model (DOM) stored in a DOM data structure.

12. The method of claim 11 wherein the DOM includes information pertaining to typed sections, typed word groups, and word level information in the file that are enhanced with rotation, skew, and relative width and height information.

13. The method of claim 1 further comprising classifying into one or more document types using one or more classifiers.

14. The method of claim 13 further comprising outputting the classification information.

15. The method of claim 1 further comprising executing a classification validation module providing an interface for reviewing, correcting, and/or manually processing files for classification is executed and outputting the classification information.

16. The method of claim 1 further comprising completing a feedback loop for executed classifiers.

17. The method of claim 1 further comprising extracting from the document using one or more extractors and outputting the extracted data.

18. The method of claim 1 further comprising executing a data extraction validation module providing an interface for correcting, and/or manually processing data points from the data extraction and outputting confirmed extracted data.

19. The method of claim 1 further comprising executing an extractor training module that facilitates completion of a feedback loop for one or more extractors.

20. The method of claim 1 further comprising exporting the processed data including classification results and extracted information.

* * * * *